United States Patent [19]

Tamai et al.

[11] Patent Number: 5,225,281
[45] Date of Patent: Jul. 6, 1993

[54] MAGNETIC RECORDING MEDIUM COMPRISING A MAGNETIC COATING CONTAINING MAGNETIC POWDER OBTAINED FROM A PROCESS OF COATING IRON OXIDE POWDER WITH SILICON, ZIRCONIUM AND ALUMINUM COMPOUNDS AND REDUCING

[75] Inventors: Kiminori Tamai; Shigeo Kurose; Kiyotaka Okuyama, all of Nagano, Japan

[73] Assignee: TDK Corporation, Tokyo, Japan

[21] Appl. No.: 668,496

[22] PCT Filed: Jul. 13, 1990

[86] PCT No.: PCT/JP90/00908

§ 371 Date: Mar. 21, 1991

§ 102(e) Date: Mar. 21, 1991

[87] PCT Pub. No.: WO91/01548

PCT Pub. Date: Jul. 2, 1991

[30] Foreign Application Priority Data

Jul. 21, 1989 [JP] Japan .................. 1-189281
Jul. 28, 1989 [JP] Japan .................. 1-196083
Jun. 21, 1990 [JP] Japan .................. 2-163353
Jun. 21, 1990 [JP] Japan .................. 2-163354

[51] Int. Cl.$^5$ ............................... G11B 5/00
[52] U.S. Cl. .......................... 428/403; 428/694 TR; 428/900; 427/128; 148/105; 252/62.55
[58] Field of Search ............... 428/332, 403, 611, 668, 428/681, 694, 900, 928, 323, 328; 148/105, 306, 307; 420/103, 125, 78, 81; 252/62.55; 427/128

[56] References Cited

U.S. PATENT DOCUMENTS

| | | | |
|---|---|---|---|
| 4,390,361 | 6/1983 | Sueyoshi et al. | 428/570 |
| 4,456,475 | 6/1984 | Hirai | 75/348 |
| 4,772,522 | 9/1988 | Kubota et al. | 428/328 |
| 4,842,657 | 6/1989 | Masumoto et al. | 148/403 |
| 4,985,073 | 1/1991 | Naumann et al. | 75/255 |

FOREIGN PATENT DOCUMENTS

| | | |
|---|---|---|
| 52-122213 | 10/1977 | Japan . |
| 52-153198 | 12/1977 | Japan . |
| 58-60506 | 4/1983 | Japan . |
| 59-159904 | 9/1984 | Japan . |
| 59-162205 | 9/1984 | Japan . |
| 62-156209 | 7/1987 | Japan . |
| 63-84076 | 4/1988 | Japan . |
| 63-306526 | 12/1988 | Japan . |
| 64-50233 | 2/1989 | Japan . |
| 64-57701 | 3/1989 | Japan . |

Primary Examiner—Paul J. Thibodeau
Assistant Examiner—Stevan A. Resan
Attorney, Agent, or Firm—Oblon, Spivak, McClelland, Maier & Neustadt

[57] ABSTRACT

The magnetic recording medium of the invention has a magnetic layer formed by mixing an iron base metal magnetic powder with a binder, the metal magnetic powder being prepared by furnishing hydrous iron oxide or iron oxide powder as a starting material, applying Zr, Al, and Si compounds or Zr, Al, and Co compounds to the powder surface, and reducing the treated powder in a reducing atmosphere. Improved surface smoothness, a low coefficient of friction, and improved dynamic durability are achievable.

10 Claims, No Drawings

MAGNETIC RECORDING MEDIUM COMPRISING A MAGNETIC COATING CONTAINING MAGNETIC POWDER OBTAINED FROM A PROCESS OF COATING IRON OXIDE POWDER WITH SILICON, ZIRCONIUM AND ALUMINUM COMPOUNDS AND REDUCING

FIELD OF THE INVENTION

This invention relates to a magnetic recording medium, and more particularly, to an improvement in iron base metal magnetic powder for use in coating type magnetic recording media.

BACKGROUND OF THE INVENTION

There is a need for higher density magnetic recording and magnetic recording media meeting such a need are desired to be higher in coercive force and saturated magnetization.

Therefore, in magnetic recording media as typified by 8-mm video tape and DAT, metal magnetic powders based on iron having a high coercive force and high saturated magnetization are suitable and have been commercially used in magnetic layers.

Also, metal magnetic powders having a metal compound clad on the surface are known to have higher coercive force and high saturated magnetization.

Japanese Patent Application Kokai No. 60506/1983, for example, discloses a metal magnetic powder having at least one of the hydroxides of Cu, Ag, Al, Ti, Zr, Sn, V, Nb, Ta, Sb, Cr, Mo, W, and Ni applied to the surface. This powder uses an oxide magnetic powder such as $\gamma$-$Fe_2O_3$ as the core material.

In turn, Japanese Patent Application Kokai No. 159904/1984 describes a metal magnetic powder having a Zr compound applied thereto.

Also, Japanese Patent Application Kokai No. 162205/1984 discloses a metal magnetic powder having a Zr compound and an Si compound applied thereto.

Further, Japanese Patent Application Kokai No. 57701/1989 describes a metal magnetic powder having a Zr compound, an Al compound, and an Ni compound and/or a Cu compound applied thereto.

All these powders are prepared by adding an aqueous solution of a compound to a slurry of starting material particles of $\gamma$-$Fe_2O_3$ and $\alpha$-FeOOH, thereby causing the compound to adhere to the starting material particles, and thereafter, effecting reductive reaction into metal magnetic powder. When it is desired to apply a plurality of compounds in a composite manner, aqueous solutions of respective compounds are prepared and applied separately.

Further, Japanese Patent Application Kokai No. 156209/1987 discloses to prepare a metal magnetic powder by applying a Zr compound to iron oxyhydroxide or iron oxide, and then applying at least one of an Si compound, a P compound, an Al compound and a B compound, followed by reduction.

Also, Japanese Patent Application Kokai No. 306526/1988 discloses a metal magnetic powder having at least one of an Al organic compound, a Ti organic compound, a Zr organic compound, and an Si organic compound applied to a metal magnetic powder and/or iron nitride magnetic powder.

Also, Japanese Patent Application Kokai No. 57701/1989 discloses a metal magnetic powder prepared by applying a Zr compound, an Al compound, and an Ni compound and/or a Cu compound to hydrous iron oxide or iron oxide and effecting reduction.

Furthermore, Japanese Patent Application No. 84076/1988 discloses to prepare a metal magnetic powder by applying a Co compound or Co ion to hydrous iron oxide and effecting reduction.

As to the 8-mm video tape technology, for example, a high-band 8-mm video version has been developed where higher output is required as well as further improvements in S/N and C/N.

In addition, for ensuring stable travel of media, it is required for the media to have a sufficiently low coefficient of friction $\mu$, typically of 0.35 or less.

Higher dynamic durability is also necessary.

However, magnetic recording media using metal magnetic powder as disclosed in the above-referred patent publications are difficult to achieve satisfactory surface smoothness, a low coefficient of friction $\mu$ during operation, and stable dynamic durability.

A significant loss of dynamic durability occurs particularly at low temperatures or at high temperatures and high humidity.

Electromagnetic properties including output, S/N and C/N are also unsatisfactory.

DISCLOSURE OF THE INVENTION

A primary object of the present invention is to provide a magnetic recording medium using an improved metal magnetic powder which has high coercive force and saturated magnetization, is suitable for high density recording, and has improved surface property, a low coefficient of friction $\mu$, and improved dynamic durability.

A second object of the present invention is to improve the electromagnetic properties of the medium in addition to the primary object.

These and other objects are achievable by the present invention defined below.

According to a first aspect of the present invention, there is provided a magnetic recording medium comprising a non-magnetic substrate and a magnetic layer formed thereon containing an iron base metal magnetic powder and a binder, the metal magnetic powder is prepared by furnishing hydrous iron oxide or iron oxide powder as a starting material, applying a Zr compound, an Al compound, and an Si compound to the surface of the powder, and reducing the coated powder in a reducing atmosphere.

Preferably, the Zr compound is applied in an amount of 0.01 to 5% by weight of Zr based on the iron of the metal magnetic powder.

Preferably, the Al compound is applied in an amount of 0.1 to 8% by weight of Al based on the iron of the metal magnetic powder.

Preferably, the Si compound is applied in an amount of 0.1 to 8% by weight of Si based on the iron of the metal magnetic powder.

Preferably, the step of applying a Zr compound, an Al compound, and an Si compound to the powder surface includes preparing a slurry of the starting material and adding an aqueous solution containing Zr, Al, and Si compounds to the slurry, followed by mixing.

Preferably, the metal magnetic powder has an average major axis length l of from 0.1 to 0.5 $\mu$m, an average minor axis length d of from 0.01 to 0.035 $\mu$m, and an average aspect ratio l/d of from 3 to 40.

Preferably, the magnetic layer has a surface roughness $R_{20}$ of up to 0.035 μm and a coefficient of friction of 0.20 to 0.35.

According to a second aspect of the present invention, there is provided a magnetic recording medium comprising a non-magnetic substrate and a magnetic layer formed thereon containing an iron base metal magnetic powder and a binder, the metal magnetic powder is prepared by furnishing hydrous iron oxide or iron oxide powder as a starting material, applying a Zr compound, an Al compound, and a Co compound to the surface of the powder, and reducing the coated powder in a reducing atmosphere.

Preferably, the Co compound is applied in an amount of at least 0.5% by weight of Co based on the iron of the metal magnetic powder.

Preferably, the Zr compound is applied in an amount of 0.01 to 5% by weight of Zr based on the iron of the metal magnetic powder.

Preferably, the Al compound is applied in an amount of 0.1 to 8% by weight of Al based on the iron of the metal magnetic powder.

Preferably, in addition to the Co, Zr, and Al compounds, an Si compound is applied in an amount of 0.1 to 8% by weight of Si based on the iron of the metal magnetic powder.

Preferably, the step of applying a Zr compound, an Al compound, and a Co compound to the powder surface includes preparing a slurry of the starting material and adding an aqueous solution containing Co, Zr, and Al compounds to the slurry, followed by mixing.

Preferably, the aqueous solution further contains an Si compound.

Preferably, the metal magnetic powder has an average major axis length l of from 0.1 to 0.5 μm, an average minor axis length d of from 0.01 to 0.035 μm, and an average aspect ratio l/d of from 3 to 40.

Preferably, the magnetic layer has a surface roughness $R_{20}$ of up to 0.035 μm and a coefficient of friction of 0.20 to 0.35.

The present invention uses a metal magnetic powder which is prepared by furnishing hydrous iron oxide powder or iron oxide powder as a starting material, applying a Zr compound, an Al compound, and an Si compound and/or a Co compound to the surface of the powder, and reducing the coated powder in a reducing atmosphere.

In the first embodiment of the invention which uses three Zr, Al, and Si compounds, the surface of the medium can be quite smooth while achieving a low coefficient of friction μ.

There is available a medium which is suitable for high density recording in that it has a high coercive force and saturated magnetization while exhibiting high dynamic durability even at low temperatures or high temperature/high humidity as well as at room temperature.

Further, the medium has so improved surface property as to provide a high output and high S/N and C/N.

The reason why these benefits are available is not well understood. However, these benefits are selectively obtained only when the starting material is hydrous iron oxide powder or iron oxide powder and three Zr, Al, and Si compounds are used in combination.

It is to be noted that Japanese Patent Application Kokai No. 306526/1988 discloses a metal magnetic powder in the form of a metal magnetic powder and/or iron nitride magnetic powder containing at least one of an Al organic compound, a Ti organic compound, a Zr organic compound, and an Si organic compound as previously mentioned.

However, unlike the present invention, the starting material used in this patent publication is a metal magnetic powder or iron nitride magnetic powder. For this reason, there is not achievable the selective benefit of the invention that the surface property of the medium can be improved while achieving a low coefficient of friction μ and improved dynamic durability.

Further, this patent publication lacks an example indicating the combined use of Al, Zr and Si compounds.

In addition, an organic solvent is used for mixing of an organic compound of Al or the like, leading to inconvenience in manufacturing process like disposal of wastes.

Furthermore, Japanese Patent Application Kokai No. 156209/1987 discloses a metal magnetic powder which is prepared by furnishing iron oxyhydroxide and/or iron oxide as a starting material, applying a Zr compound to the surface thereof, and then applying at least one of an Si compound, a P compound, an Al compound and a B compound as previously mentioned.

However, an example indicating the combined use of Zr, Al, and Si compounds is lacking.

The selective benefit achievable by the present invention is suggested nowhere.

In the second embodiment of the invention which uses three Zr, Al, and Co compounds, there is also available a medium that has improved surface nature and a low coefficient of friction μ and exhibits high dynamic durability even at low temperatures or high temperature/high humidity as well as at room temperature.

The medium additionally exhibits improved electromagnetic properties including further improved output and S/N or C/N.

The medium is suitable for high density recording in that it has a high coercive force and saturated magnetization.

The reason why these benefits are available is also not well understood. However, these benefits are selectively obtained only when three Co, Zr, and Al compounds are used in combination.

Further, none of the above referred patent publications describe an example of the combined use of Co, Al, and Zr compounds. There is suggested nowhere the selective benefits of the invention including improved surface property, a high output, high S/N or C/N, a low coefficient of friction μ, and improved dynamic durability.

BEST MODE FOR CARRYING OUT THE INVENTION

The construction of the present invention is now described in further detail.

According to the present invention, there is used an iron base metal magnetic powder comprising iron as a major component and having combined specific compounds applied to the surface thereof.

The starting material from which the metal magnetic powder is prepared according to the invention or starting powder to which the specific compounds are applied as will be described later is hydrous iron oxide or iron oxide.

The benefits of the invention are not available if metal magnetic powder is used as the starting material and the specific compounds are directly applied thereto.

Examples of the starting material used herein include iron oxyhydroxides such as α-FeOOH (goethite), β-FeOOH (akaganite), and γ-FeOOH (lepidocrocite); iron oxides such as α$Fe_2O_3$, γ-$Fe_2O_3$, $Fe_3O_4$, and γ-$Fe_2O_3$-$Fe_3O_4$ (solid solution); and those iron oxyhydroxides and oxides doped with one or more additional metals such as Co, Mn, Ni, Ti, Bi, Mo, and Ag.

The specific compounds used in combination are a Zr compound, an Al compound, and an Si compound in the first embodiment, and a Zr compound, an Al compound, and a Co compound in the second embodiment.

The quantity of additional metal(s) doped in the starting material should preferably be up to 30 atom % in total calculated as element(s) relative to the iron.

The starting material may have any desired form, for example, needle form or granular form, and a choice of a particular form depends on the intended purpose of the associated magnetic recording medium. Particularly when the medium is used as video tape or audio tape, a starting material of needle form, especially needle form having an average major axis length l of from 0.1 to 0.5 μm and an average minor axis length d of from 0.01 to 0.035 μm is preferred.

Further, a starting material having an average aspect ratio l/d of from 3 to 40 is preferred.

According to the invention, a Zr compound, an Al compound, and an Si compound and/or a Co compound, all of which are generally water soluble, are applied or adsorbed to the starting material containing iron.

The benefits of the invention are lost with the use of the respective compounds alone or in a combination of two of them, or in a combination of one or two of them with another compound.

Examples of the Zr compound used herein include commonly known zirconium compounds such as zirconium nitrate, zirconium sulfate, zirconyl chloride, zirconyl acetate, zirconium hydroxide, zirconium oxychloride, zirconium chloride, ammonium zirconyl carbonate, and organic zirconium compounds such as $ZrO(C_8H_{15}O_2)_2$.

The Zr compounds may be used alone or in admixture of two or more. In a mixture of two or more Zr compounds, they may be present in any desired proportion.

Examples of the Al compound used herein include commonly known aluminum compounds such as sodium aluminate and sodium meta-aluminate.

Also, the Al compounds may be used alone or in admixture of two or more. In a mixture of two or more Al compounds, they may be present in any desired proportion.

Examples of the Si compound used herein include commonly known silicon compounds such as sodium silicate.

Also, the Si compounds may be used alone or in admixture of two or more. In a mixture of two or more Si compounds, they may be present in any desired proportion.

Examples of the Co compound used herein include commonly known cobalt compounds which can be present on metal magnetic powder as applied, such as cobalt sulfate, cobalt hydroxide, and cobalt chloride.

Also, the Co compounds may be used alone or in admixture of two or more. In a mixture of two or more Co compounds, they may be present in any desired proportion.

These Zr, Al, Si and Co compounds can be selected from those described in the above-referred Japanese Patent Application Kokai Nos. 60506/1983, 159904/1984, 162205/1984, 156209/1987, and 57701/1989.

According to the present invention, the starting material or source powder is added to water and agitated to prepare a slurry of the source powder.

The concentration of the source powder in the slurry is generally of the order of 1 to 10% by weight.

Next, an aqueous solution of Zr, Al, and Si and/or Co compounds is added to the slurry for reaction.

Reaction may be effected by agitating the mixture at 10° to 30° C. for about 30 to about 120 minutes.

It is also possible to prepare aqueous solutions of Zr, Al, Si, and Co compounds separately, and apply the solutions separately for the respective compounds as described in the above-referred patent publications.

It is to be noted that the benefits of the invention become more outstanding with the use of an aqueous solution of the respective compounds which is prepared by adding them concurrently, because surface smoothness, coefficient of friction, and dynamic durability at low temperatures are further improved as well as output.

Although the reason why the benefits of the invention become enhanced by concurrent addition and concurrent application of the respective compounds is not well understood, one probable factor is a difference in microscopic attachment form upon application Therefore, it is preferred in the practice of the invention to add an aqueous solution containing Zr, Al, and Si and/or Co compounds at the same time.

Where Zr, Al and Si compounds are added in admixture of the three compounds, the preferred amount of each compound added is 0.01 to 5% by weight, especially 0.02 to 4% by weight, more preferably 0.05 to 2% by weight for the Zr compound, 0.1 to 8% by weight, especially 0.2 to 7% by weight, more preferably 0.5 to 5% by weight for the Al compound, and 0.1 to 8% by weight, especially 0.2 to 7% by weight, more preferably 0.5 to 5% by weight for the Si compound, each calculated as an element, based on the Fe of the starting material.

Where Zr, Al and Co compounds are added in admixture of the three compounds, the preferred amount of each compound added is 0.01 to 5% by weight, especially 0.02 to 4% by weight, more preferably 0.05 to 2% by weight for the Zr compound, 0.1 to 8% by weight, especially 0.2 to 7% by weight, more preferably 0.5 to 5% by weight for the Al compound, and at least 0.5% by weight, especially 1 to 30% by weight for the Co compound, each calculated as an element, based on the Fe of the starting material.

In the latter embodiment, an Si compound is preferably added in an amount of 0.1 to 8% by weight, especially 0.5 to 5% by weight, calculated as an element, based on the Fe of the starting material, mainly as an anti-sintering agent during heat reduction.

It is to be noted that one or more additional metal compounds may be applied to the starting material or source powder in addition to the Zr, Al, and Si and/or Co compounds. Such additional metals include Zn, Mn, and Ni.

The amount of the additional metal compound adhered is preferably up to 5% by weight in total, calculated as an element, based on the iron of the metal magnetic powder.

The concentration of the respective compounds in an aqueous solution to be added to a slurry of the source powder is about 2 to 12% in total.

The aqueous solution to be added is preferably adjusted to about pH 8 to 13 by adding sodium hydroxide, potassium hydroxide or the like.

Agitation for a predetermined time is followed by filtration, washing, and drying.

The powder having the respective compounds attached or adsorbed thereto in this way is then reduced by heating in a reducing gas stream.

The heat reducing atmosphere is generally a hydrogen gas atmosphere.

Reduction may be effected by heating at a temperature of 400° to 550° C., especially 450° to 550° C. for a time of about 5 to about 8 hours.

In this way, there is obtained a metal magnetic powder having a Zr compound, an Al compound, and an Si compound and/or a Co compound attached near the surface of magnetic particles of iron or mainly of iron.

In the metal magnetic powder of the present invention, Zr, Al, and Si and/or Co are present as attached or adsorbed in the form of the original Zr compound, Al compound, Si compound, and Co compound, or in the form of Zr oxide, Al oxide, Si oxide, and Co oxide or Zr hydroxide, Al hydroxide, Si hydroxide, and Co hydroxide, or in the form of Fe-Zr alloy, Fe-Al alloy, Fe-Si alloy, Fe-Co alloy, Fe-Al-Zr alloy, Fe-Co-Zr alloy, Fe-Co-Al alloy, Fe-Co-Al-Zr alloy, Fe-Zr-Al-Si alloy and the like.

Most often, Zr, Al, Si and Co are present in any one of the source compound, oxide, hydroxide, and alloy forms of any one or more of these forms. The benefits of the invention are available in any case.

In this embodiment, Zr is preferably contained in an amount of 0.01 to 5% by weight, especially 0.02 to 4% by weight, more preferably 0.05 to 2% by weight based on the iron of the metal magnetic powder.

A Zr content below this range would lead to a higher coefficient of friction $\mu$ whereas a Zr content beyond this range would lead to increased surface roughness.

Al is preferably contained in an amount of 0.1 to 8% by weight, especially 0.2 to 7% by weight, more preferably 0.5 to 5% by weight based on the iron of the metal magnetic powder. The benefits of the invention would diminish outside this range.

Also, Si is preferably contained in an amount of 0.1 to 8% by weight, especially 0.2 to 7% by weight, more preferably 0.5 to 5% by weight based on the iron of the metal magnetic powder. The benefits of the invention would diminish outside this range.

Further, Co is preferably contained in an amount of at least 0.5% by weight, especially 1 to 30% by weight based on the iron of the metal magnetic powder.

Below this range, it is difficult to produce a sufficient output and S/N and C/N become insufficient.

Too high contents of Co would invite an increase of noise component, resulting in a lowering of S/N and C/N.

In a further embodiment where Co, Al, Zr and Si are used together, Si is preferably contained in an amount of 0.1 to 8% by weight, especially 0.5 to 5% by weight based on the iron of the metal magnetic powder.

The content of Si in this range contributes to a further improvement in dynamic durability, especially at low temperatures.

It is contemplated that the metal magnetic powder contains one or more additional metals such as Zn, Mn, and Ni in a total content of up to 5% by weight.

The metal magnetic powder may have an oxide coating on the surface.

A magnetic recording medium using such a metal magnetic powder having an oxide coating is advantageous in preventing a loss of magnetic flux density and a loss of properties due to rust formation in the magnetic layer by the ambient atmosphere including temperature and humidity.

The metal magnetic powder used herein may have either needle form or particulate form, and a choice of a particular form depends on the intended purpose of the associated magnetic recording medium. Particularly when the medium is used as magnetic tape of the video tape size, needle form, especially needle form having an average major axis length l of from 0.1 to 0.5 $\mu$m and an average minor axis length d of from 0.01 to 0.035 $\mu$m is preferred.

Further, a metal magnetic powder having an average aspect ratio l/d of from 3 to 40 is preferred.

The metal magnetic powder possesses a coercive force of about 1,100 to 2,000 Oe and a residual magnetization or remanence of 110 to 150 emu/g.

According to the present invention, a magnetic layer is generally formed using the above-prepared metal magnetic powder only, although, if necessary, another magnetic powder, for example, metal magnetic powder and oxide magnetic powder may be used in an amount of up to about 50% by weight.

A magnetic coating composition is prepared from the metal magnetic powder using a binder which may be a thermoplastic binder, a thermosetting binder, or an electron beam curable binder.

The metal magnetic powder and the binder are mixed in a ratio Wm/Wb of from about ½ to about 8/1 wherein Wm is the weight of the metal magnetic powder and Wb is the weight of the binder.

For any binder used herein, various antistatic agents, lubricants, dispersants, abrasives, film strength reinforcing agents and other additives may be advantageously added in accordance with a particular application.

The magnetic layer has a thickness of about 0.5 to about 6 $\mu$m, especially about 2.7 to about 3.5 $\mu$m in the case of 8-mm video tape.

The magnetic layer also has a coercive force of about 800 to about 2,500 Oe, especially about 1,100 to about 2,500 Oe and a residual magnetic flux density of about 1,500 to about 3,500 G.

The non-magnetic substrate on which the magnetic layer is formed by coating may be selected from conventional well-known materials. The medium of the invention may have such a magnetic layer on one or both surfaces of the substrate.

An undercoat layer and a backcoat layer may be provided if necessary.

Further, the medium of the invention may be tape, disk or the like.

The magnetic recording medium of the invention thus fabricated preferably has a coefficient of friction $\mu$ of 0.20 to 0.35 in the case of 8-mm video tape, for example.

A coefficient of friction $\mu$ beyond 0.35 hinders stable travel often causing a stop whereas below 0.20, tape edge folding often occurs.

The coefficient of friction $\mu$ may be measured as follows.

Tape is wrapped around a fixed pin of SUS 304 over a wrapping angle of 180 degrees.

The tape is moved while a tension $T_1$ is applied to the tape portion extending from the fixed pin to the take-up side and a tension $T_0$ applied to the tape portion extending from the fixed pin to the supply side.

The tape is moved at a speed of 14.3 mm/sec. under a tension $T_0$ of 10 grams to measure the initial value of $T_1$, from which the coefficient of friction $\mu$ is calculated according to the following formula.

$$\mu = \{\log_e(T_1/T_0)\}/\pi$$

The surface roughness $R_{20}$ of the tape is not critical when the coefficient of friction $\mu$ is in the range of from 0.20 to 0.35, but is preferably 0.035 $\mu$m or less.

An $R_{20}$ in excess of 0.035 $\mu$m would provide a larger spacing loss, which results in a loss of electromagnetic properties, for example, output, S/N and C/N.

$R_{20}$ may be measured in accordance with the 10 point average roughness $R_{10}$ described in JIS B 0601.

EXAMPLE

Examples of the present invention are given below by way of illustration.

EXAMPLE 1

A starting material, 100 grams of needle $\alpha$-FeOOH was added to 6 liters of water, which was agitated and mixed by an agitator to form a slurry.

The $\alpha$-FeOOH used had an average major axis length l of 0.35 $\mu$m, an average minor axis length d of 0.015 $\mu$m, and an average aspect ratio l/d of 23.

Separately, an aqueous solution was prepared by furnishing sodium aluminate in an amount of 5.0% by weight calculated as Al relative to the Fe in the starting material, zirconium oxychloride in an amount of 0.5% by weight calculated as Zr relative to the Fe in the starting material, and sodium silicate in an amount of 0.5% by weight calculated as Si relative to the Fe in the starting material, and adding water to them to 1 liter. To this solution was added 1 liter of an aqueous solution containing 1 mol/l of NaOH, and the solutions were agitated for mixing.

The aqueous solution was added to the slurry, which was agitated for one hour at room temperature, filtered, washed, and dried.

There was collected 50 grams of $\alpha$-FeOOH having sodium aluminate, zirconium oxychloride, and sodium silicate adhered to the surface thereof, which was reduced with hydrogen at a temperature of 470° C. and a hydrogen flow rate of 1.5 liter/min. over 6 hours.

The product was cooled down to room temperature and then dipped in a toluene solution for 10 minutes while blowing air therein, thereby air drying the product.

The resulting metal magnetic powder was dissolved in hydrochloric acid and subjected to chemical analysis to find the inclusion of 4.3% by weight of Al, 0.42% by weight of Zr and 0.45% by weight of Si relative to the Fe.

From ESCA and other analytic results, it was presumed that Zr, Al and Si were, in part, bonded to Fe and in part, present as hydroxides and oxides.

Using the thus obtained metal magnetic powder, a magnetic coating composition was prepared in the following blending proportion.

|  | Parts by weight |
|---|---|
| Metal magnetic powder | 100 |
| Vinyl chloride-vinyl acetate-vinyl alcohol copolymer (VAGH by UCC) | 10 |
| Polyurethane resin (N-2304 by Nihon Polyurethane K.K.) | 10 |
| Low molecular weight polyisocyanate (Colonate L by Nihon Polyurethane K.K.) | 5 |
| Stearic acid | 0.2 |
| Lecithin | 0.5 |
| $Al_2O_3$ | 5 |
| Toluene | 50 |
| Methyl ethyl ketone | 50 |
| Methyl isobutyl ketone | 50 |

This magnetic coating composition was coated on a polyester film of 10 $\mu$m thick, oriented, calendered, and then thermoset. The magnetic layer had a final thickness of 3.0 $\mu$m.

The film was cut to a width of 8 mm by a slitter, obtaining magnetic recording tape sample No. 1.

Magnetic recording tape sample Nos. 2 to 8 and comparative sample Nos. 9 to 15 were prepared by the same procedure as sample No. 1 except that in preparing the metal magnetic powder, the type and proportion of the compounds added were changed as shown below. It is to be noted that only for sample No. 4, the starting material used was needle $\alpha$-Fe$_2$O$_3$.

Sample No. 2 (Invention)

There were added sodium aluminate in an amount of 0.5% by weight calculated as Al relative to the Fe in the starting material, zirconium oxychloride in an amount of 0.05% by weight calculated as Zr relative to the Fe, and sodium silicate in an amount of 5.0% by weight calculated as Si relative to the Fe.

Sample No. 3 (Invention)

There were added sodium aluminate in an amount of 3.0% by weight calculated as Al relative to the Fe in the starting material, zirconium oxychloride in an amount of 2.0% by weight calculated as Zr relative to the Fe, and sodium silicate in an amount of 1.0% by weight calculated as Si relative to the Fe.

Sample No. 4 (Invention)

The following source powder was used in this sample only.
Starting material: needle $\alpha$-Fe$_2$O$_3$
Average major axis length l: 0.25 $\mu$m
Average minor axis length d: 0.020 $\mu$m
Average aspect ratio l/d: 12.5

There were added sodium aluminate in an amount of 1.5% by weight calculated as Al relative to the Fe in the starting material, zirconium oxychloride in an amount of 0.5% by weight calculated as Zr relative to the Fe, and sodium silicate in an amount of 3.0% by weight calculated as Si relative to the Fe.

Sample No. 5 (Invention)

There were added sodium aluminate in an amount of 5.0% by weight calculated as Al relative to the Fe in the starting material, zirconium oxychloride in an amount of 0.5% by weight calculated as Zr relative to the Fe, sodium silicate in an amount of 0.5% by weight calculated as Si relative to the Fe, and zinc sulfate in an amount of 2.0% by weight calculated as Zn relative to the Fe.

Sample No. 6 (Invention)

There were added sodium aluminate in an amount of 2.0% by weight calculated as Al relative to the Fe in the starting material, zirconium oxychloride in an amount of 0.5% by weight calculated as Zr relative to the Fe, manganese sulfate in an amount of 0.5% by weight calculated as Mn relative to the Fe, and sodium silicate in an amount of 1.0% by weight calculated as Si relative to the Fe.

Sample No. 7 (Invention)

There were added sodium aluminate in an amount of 2.0% by weight calculated as Al relative to the Fe in the starting material, zirconium oxychloride in an amount of 0.5% by weight calculated as Zr relative to the Fe, nickel sulfate in an amount of 0.5% by weight calculated as Ni relative to the Fe, and sodium silicate in an amount of 1.0% by weight calculated as Si relative to the Fe.

Sample No. 8 (Invention)

In sample No. 1, aqueous solutions of the respective compounds were separately prepared, the procedure including the steps of addition, mixing, filtration and drying was repeated for every aqueous solution, and the respective compounds were applied in the order of Zr, Si and Al.

Sample No. 9 (Comparison)

There was added only zirconium oxychloride in an amount of 0.5% by weight calculated as Zr relative to the Fe in the starting material.

Sample No. 10 (Comparison)

There was added only sodium aluminate in an amount of 5.0% by weight calculated as Al relative to the Fe in the starting material.

Sample No. 11 (Comparison)

There were added zirconium oxychloride in an amount of 0.5% by weight calculated as Zr relative to the Fe in the starting material and sodium silicate in an amount of 2.0% by weight calculated as Si relative to the Fe.

Sample No. 12 (Comparison)

There were added zirconium oxychloride in an amount of 0.5% by weight calculated as Zr relative to the Fe in the starting material and sodium aluminate in an amount of 5.0% by weight calculated as Al relative to the Fe.

Sample No. 13 (Comparison)

There were added sodium aluminate in an amount of 2.0% by weight calculated as Al relative to the Fe in the starting material and sodium silicate in an amount of 1.0% by weight calculated as Si relative to the Fe.

Sample No. 14 (Comparison)

There were added zirconium oxychloride in an amount of 0.5% by weight calculated as Zr relative to the Fe in the starting material, sodium aluminate in an amount of 3.0% by weight calculated as Al relative to the Fe, and nickel sulfate in an amount of 1.0% by weight calculated as Ni relative to the Fe.

Sample No. 15 (Comparison)

There were added zirconium oxychloride in an amount of 0.5% by weight calculated as Zr relative to the Fe in the starting material, sodium aluminate in an amount of 3.0% by weight calculated as Al relative to the Fe, and sodium titanate in an amount of 1.0% by weight calculated as Ti relative to the Fe.

The metal magnetic powder used in each sample was chemically analyzed to find that the contents of Zr, Al, Si, Zn, Mn, Ni and Ti relative to the Fe are somewhat smaller than the amounts of these elements added, but in substantially the same proportion as reported for sample No. 1.

The samples were measured for surface roughness $R_{20}$, coefficient of friction $\mu$, and dynamic durability at a low temperature ($-10°$ C.) and high temperature/high humidity (40° C./RH80%).

Surface Roughness $R_{20}$ $R_{20}$ was measured in accordance with the 10 point average roughness $R_{10}$ described in JIS B 0601.

Coefficient of Friction $\mu$

Tape is wrapped around a fixed pin of SUS 304 over a wrapping angle of 180 degrees.

The tape is moved while a tension $T_1$ is applied to the tape portion extending from the fixed pin to the take-up side and a tension $T_0$ applied to the tape portion extending from the fixed pin to the supply side.

The tape is moved at a speed of 14.3 mm/sec. under a tension $T_0$ of 10 grams to measure the initial value of $T_1$, from which the coefficient of friction $\mu$ is calculated according to the following formula.

$$\mu = \{\log_e(T_1/T_0)\}/\pi$$

Dynamic Durability

A sample is subjected to a 100-pass test in a VCR at a low temperature ($-10°$ C.) and high temperature/high humidity (40° C./RH80%).

Magnetic head clogging, output lowering, output fluctuation are regarded as troubles.

One sample contained 36 rolls of tape, each of which was subjected to the 100-pass test. Among the 36 rolls, the number of those rolls in which any trouble occurred during the 100-pass test was counted. Evaluation was made according to the following criterion.

Criterion

◉: trouble occurrence 0%
○: trouble occurrence more than 0%, up to 10%
△: trouble occurrence more than 10%, up to 20%
×: trouble occurrence more than 20%

The results are shown in Table 1.

TABLE 1

| Sample No. | Amount added relative to Fe (wt %) | | | | | | | Surface roughness $R_{20}(\mu m)$ | Coefficient of friction | Dynamic durability | |
|---|---|---|---|---|---|---|---|---|---|---|---|
| | Zr | Al | Si | Zn | Mn | Ni | Ti | | | low temp. | high temp. |
| 1 Invention | 0.5 | 5.0 | 0.5 | — | — | — | — | 0.0215 | 0.31 | ⊚ | ⊚ |
| 2 Invention | 0.05 | 0.5 | 5.0 | — | — | — | — | 0.0220 | 0.30 | ⊚ | ⊚ |
| 3 Invention | 2.0 | 3.0 | 1.0 | — | — | — | — | 0.0260 | 0.27 | ⊚ | ⊚ |
| 4 Invention | 0.5 | 1.5 | 3.0 | — | — | — | — | 0.0230 | 0.32 | ⊚ | ⊚ |
| 5 Invention | 0.5 | 5.0 | 0.5 | 2.0 | — | — | — | 0.0220 | 0.31 | ⊚ | ⊚ |
| 6 Invention | 0.5 | 2.0 | 1.0 | — | 0.5 | — | — | 0.0235 | 0.31 | ⊚ | ⊚ |
| 7 Invention | 0.5 | 2.0 | 1.0 | — | — | 0.5 | — | 0.0220 | 0.32 | ⊚ | ⊚ |
| 8 Invention | 0.5 | 5.0 | 0.5 | — | — | — | — | 0.0225 | 0.34 | ◯ | ⊚ |
| 9 Comparison | 0.5 | — | — | — | — | — | — | 0.0280 | 0.41 | X | ⊚ |
| 10 Comparison | — | 5.0 | — | — | — | — | — | 0.0200 | 0.44 | X | Δ |
| 11 Comparison | 0.5 | — | 2.0 | — | — | — | — | 0.0330 | 0.39 | Δ | ⊚ |
| 12 Comparison | 0.5 | 5.0 | — | — | — | — | — | 0.0230 | 0.37 | X | Δ |
| 13 Comparison | — | 2.0 | 1.0 | — | — | — | — | 0.0185 | 0.42 | X | Δ |
| 14 Comparison | 0.5 | 3.0 | — | — | — | — | — | 0.0210 | 0.39 | Δ | ⊚ |
| 15 Comparison | 0.5 | 3.0 | — | — | — | — | 1.0 | 0.0215 | 0.39 | Δ | ⊚ |

The effectiveness of the present invention is evident from the results shown in Table 1.

More particularly, all comparative sample Nos. 9 to 15 had a coefficient of friction $\mu$ in excess of 0.35 above which they were not acceptable as the commercial 8-mm video tape.

Sample No. 9 having only Zr added had poor surface property and a high coefficient of friction $\mu$. Sample No. 10 having only Al added, in turn, had improved surface property, but a rather increased coefficient of friction $\mu$.

Sample Nos. 11 and 12 based on the combined use of Zr with Al and Zr with Si, respectively, had a higher coefficient of friction $\mu$, compared to the values of surface roughness $R_{20}$.

All the comparative samples showed poor dynamic durability, particularly at a low temperature.

In contrast, the samples of the invention are improved in surface roughness while maintaining a quite low coefficient of friction $\mu$.

Dynamic durability is improved, and especially the improvement in dynamic durability at a low temperature is of significance.

A comparison of sample No. 1 with No. 8 shows that it is rather better to concurrently apply the respective compounds as specified by the invention.

Equivalent results were obtained when the starting material was $\alpha$-$Fe_2O_3$.

EXAMPLE 2

A starting material, 100 grams of the same needle $\alpha$-FeOOH as specified in Example 1 was added to 6 liters of water, which was agitated and mixed by an agitator to form a slurry.

Separately, an aqueous solution was prepared by furnishing sodium aluminate in an amount of 5.0% by weight calculated as Al relative to the Fe in the starting material, zirconium oxychloride in an amount of 0.1% by weight calculated as Zr relative to the Fe in the starting material, cobalt sulfate in an amount of 1.0% by weight calculated as Co relative to the Fe in the starting material, and sodium hydroxide in an amount of 200 mol % relative to the cobalt sulfate, and adding water to them to 1 liter.

The aqueous solution was added to the slurry, which was agitated for one hour at room temperature, filtered, washed, and dried.

There was collected 50 grams of $\alpha$-FeOOH, which was reduced with hydrogen at a temperature of 470° C. and a hydrogen flow rate of 1.5 liter/min. over 6 hours.

The product was cooled down to room temperature and then dipped in a toluene solution for 10 minutes while blowing air therein, thereby air drying the product.

The resulting metal magnetic powder was dissolved in hydrochloric acid and subjected to chemical analysis to find substantially the same contents of Al, Zr and Co relative to the Fe as the initial addition.

From ESCA and other analytic results, it was presumed that Zr, Al and Co were partially bonded to Fe and partially present as hydroxides and oxides.

Using the thus obtained metal magnetic powder, a magnetic coating composition was prepared by the same procedure as in Example 1.

This magnetic coating composition was coated on a polyester film of 10 $\mu$m thick, oriented, calendered, and then thermoset. The magnetic layer had a final thickness of 3.0 $\mu$m.

The film was cut to a width of 8 mm by a slitter, obtaining magnetic recording tape sample No. 21.

Magnetic recording tape sample Nos. 22 to 29 and comparative sample Nos. 30 to 37 were prepared by the same procedure as sample No. 21 except that in preparing the metal magnetic powder, the type and proportion of the compounds added were changed as shown below.

Sample No. 2 (Invention)

There were added sodium aluminate in an amount of 5.0% by weight calculated as Al relative to the Fe in the starting material, zirconium oxychloride in an amount of 0.1% by weight calculated as Zr relative to the Fe, cobalt sulfate in an amount of 5.0% by weight calculated as Co relative to the Fe, and sodium hydroxide in an amount of 200 mol % relative to the cobalt sulfate.

Sample No. 23 (Invention)

There were added sodium aluminate in an amount of 5.0% by weight calculated as Al relative to the Fe in the starting material, zirconium oxychloride in an amount of 0.5% by weight calculated as Zr relative to the Fe, cobalt sulfate in an amount of 5.0% by weight calculated as Co relative to the Fe, and sodium hydroxide in an amount of 200 mol % relative to the cobalt sulfate.

Sample No. 24 (Invention)

There were added sodium aluminate in an amount of 5.0% by weight calculated as Al relative to the Fe in the starting material, zirconium oxychloride in an amount of 2.0% by weight calculated as Zr relative to the Fe, cobalt sulfate in an amount of 5.0% by weight calculated as Co relative to the Fe, and sodium hydroxide in an amount of 200 mol % relative to the cobalt sulfate.

Sample No. 25 (Invention)

There were added sodium aluminate in an amount of 5.0% by weight calculated as Al relative to the Fe in the starting material, zirconium oxychloride in an amount of 0.1% by weight calculated as Zr relative to the Fe, sodium silicate in an amount of 1.5% by weight calculated as Si relative to the Fe, cobalt sulfate in an amount of 1.0% by weight calculated as Co relative to the Fe, and sodium hydroxide in an amount of 200 mol % relative to the cobalt sulfate.

Sample No. 26 (Invention)

There were added sodium aluminate in an amount of 5.0% by weight calculated as Al relative to the Fe in the starting material, zirconium oxychloride in an amount of 0.1% by weight calculated as Zr relative to the Fe, sodium silicate in an amount of 1.5% by weight calculated as Si relative to the Fe, cobalt sulfate in an amount of 5.0% by weight calculated as Co relative to the Fe, and sodium hydroxide in an amount of 200 mol % relative to the cobalt sulfate.

Sample No. 27 (Invention)

There were added sodium aluminate in an amount of 5.0% by weight calculated as Al relative to the Fe in the starting material, zirconium oxychloride in an amount of 0.5% by weight calculated as Zr relative to the Fe, sodium silicate in an amount of 1.5% by weight calculated as Si relative to the Fe, cobalt sulfate in an amount of 5.0% by weight calculated as Co relative to the Fe, and sodium hydroxide in an amount of 200 mol % relative to the cobalt sulfate.

Sample No. 28 (Invention)

There were added sodium aluminate in an amount of 5.0% by weight calculated as Al relative to the Fe in the starting material, zirconium oxychloride in an amount of 2.0% by weight calculated as Zr relative to the Fe, sodium silicate in an amount of 1.5% by weight calculated as Si relative to the Fe, cobalt sulfate in an amount of 5.0% by weight calculated as Co relative to the Fe, and sodium hydroxide in an amount of 200 mol % relative to the cobalt sulfate.

Sample No. 29 (Invention)

In sample No. 21, aqueous solutions of the respective compounds were separately prepared, the procedure including the steps of addition, mixing, filtration and drying was repeated for every aqueous solution, and the respective compounds were applied in the order of Al, Zr, and Co.

Sample No. 30 (Comparison)

There were added sodium aluminate in an amount of 5.0% by weight calculated as Al relative to the Fe in the starting material, cobalt sulfate in an amount of 1.0% by weight calculated as Co relative to the Fe, and sodium hydroxide in an amount of 200 mol % relative to the cobalt sulfate.

Sample No. 31 (Comparison)

There were added sodium aluminate in an amount of 5.0% by weight calculated as Al relative to the Fe in the starting material and zirconium oxychloride in an amount of 0.1% by weight calculated as Zr relative to the Fe.

Sample No. 32 (Comparison)

There were added zirconium oxychloride in an amount of 0.5% by weight calculated as Zr relative to the Fe, cobalt sulfate in an amount of 5.0% by weight calculated as Co relative to the Fe, and sodium hydroxide in an amount of 200 mol % relative to the cobalt sulfate.

Sample No. 33 (Comparison)

There were added zirconium oxychloride in an amount of 0.1% by weight calculated as Zr relative to the Fe, sodium silicate in an amount of 1.5% by weight calculated as Si relative to the Fe, cobalt sulfate in an amount of 5.0% by weight calculated as Co relative to the Fe, and sodium hydroxide in an amount of 200 mol % relative to the cobalt sulfate.

Sample No. 34 (Comparison)

There were added sodium aluminate in an amount of 5.0% by weight calculated as Al relative to the Fe in the starting material, sodium silicate in an amount of 1.5% by weight calculated as Si relative to the Fe, cobalt sulfate in an amount of 5.0% by weight calculated as Co relative to the Fe, and sodium hydroxide in an amount of 200 mol % relative to the cobalt sulfate.

Sample No. 35 (Comparison)

There were added sodium aluminate in an amount of 5.0% by weight calculated as Al relative to the Fe in the starting material, zirconium oxychloride in an amount of 0.1% by weight calculated as Zr relative to the Fe, and sodium silicate in an amount of 1.5% by weight calculated as Si relative to the Fe.

Sample No 36 (Comparison)

No metal compounds were added.

The metal magnetic powder used in each sample was chemically analyzed to find that the contents of Co, Zr, Al, and Si relative to the Fe were substantially the same amounts of these elements added.

The samples were measured for output (Y-output) and C/N (Y-C/N) of a luminance signal at 7 MHz, output (C-output) and C/N (C-C/N) of a color signal at 750 kHz, coefficient of friction $\mu$, and surface roughness $R_{20}$.

The output and C/N are represented by a ratio relative to the output and C/N of sample No. 30 and expressed in dB.

Each sample was subjected to the dynamic durability test of Example 1.

The results are shown in Table 2.

TABLE 2

| Sample No. | Co | Zr | Al | Si | Y-output [dB] | Y-C/N [dB] | C-output [dB] | C-C/N [dB] | Coefficient of friction μ | Surface roughness $R_{20}[\mu m]$ | Dynamic durability Low temp. | Dynamic durability High temp. |
|---|---|---|---|---|---|---|---|---|---|---|---|---|
| 21 Invention | 1.0 | 0.1 | 5.0 | — | 1.5 | 1.0 | 0.2 | 0 | 0.28 | 0.020 | ⓒ | ⓒ |
| 22 Invention | 5.0 | 0.1 | 5.0 | — | 1.6 | 1.0 | 0.2 | 0.1 | 0.28 | 0.018 | ⓒ | ⓒ |
| 23 Invention | 5.0 | 0.5 | 5.0 | — | 1.5 | 0.9 | 0.2 | 0 | 0.27 | 0.019 | ⓒ | ⓒ |
| 24 Invention | 5.0 | 2.0 | 5.0 | — | 1.4 | 0.9 | 0.1 | 0.1 | 0.26 | 0.018 | ⓒ | ⓒ |
| 25 Invention | 1.0 | 0.1 | 5.0 | 1.5 | 1.5 | 1.0 | 0.2 | 0.1 | 0.28 | 0.020 | ⓒ | ⓒ |
| 26 Invention | 5.0 | 0.1 | 5.0 | 1.5 | 1.6 | 1.1 | 0.2 | 0.1 | 0.28 | 0.018 | ⓒ | ⓒ |
| 27 Invention | 5.0 | 0.5 | 5.0 | 1.5 | 1.6 | 1.1 | 0.2 | 0 | 0.27 | 0.019 | ⓒ | ⓒ |
| 28 Invention | 5.0 | 2.0 | 5.0 | 1.5 | 1.5 | 1.0 | 0.1 | 0.1 | 0.26 | 0.018 | ⓒ | ⓒ |
| 29 Invention | 1.0 | 0.1 | 5.0 | — | 1.2 | 0.7 | 0 | 0 | 0.33 | 0.020 | ○ | ⓒ |
| 30 Comparison | 1.0 | — | 5.0 | — | 1.5 | 1.0 | 0.2 | 0 | 0.38 | 0.018 | X | △ |
| 31 Comparison | — | 0.1 | 5.0 | — | −0.1 | 0 | 0 | −0.2 | 0.29 | 0.019 | X | △ |
| 32 Comparison | 5.0 | 0.5 | — | — | 1.2 | 0.5 | 0 | −0.5 | 0.25 | 0.025 | △ | ⓒ |
| 33 Comparison | 5.0 | 0.1 | — | 1.5 | 1.1 | 0.3 | −0.2 | −0.6 | 0.29 | 0.030 | X | ⓒ |
| 34 Comparison | 5.0 | — | 5.0 | 1.5 | 1.5 | 1.0 | 0.2 | 0 | 0.43 | 0.020 | X | △ |
| 35 Comparison | — | 0.1 | 5.0 | 1.5 | 0 | −0.1 | 0.1 | 0 | 0.28 | 0.019 | ⓒ | ⓒ |
| 36 Comparison | — | — | — | — | −0.5 | −1.0 | −0.3 | −1.1 | 0.42 | 0.028 | X | X |

The effectiveness of the present invention is evident from the results shown in Table 2.

More particularly, sample No. 31 having Co and Al added had a coefficient of friction μ in excess of 0.35 above which it was not acceptable as the commercial 8-mm video tape. Sample No. 31 having Zr and Al added had low output and C/N, and sample No. 32 having Co and Zr added had insufficient C/N due to poor surface property.

All these samples showed poor dynamic durability, particularly at a low temperature.

Sample No. 35 having Zr, Al and Si added had improved dynamic durability, but was insufficient in output and C/N.

In contrast, the samples of the invention are improved in all of electromagnetic properties, coefficient of friction μ, surface property, and dynamic durability.

As compared with sample Nos. 21 to 24 having only Co, Zr and Al added, sample Nos. 25 to 28 having Si further added were further improved in dynamic durability at low temperatures.

A comparison of sample No. 21 with No. 29 shows that it is rather better to concurrently apply the respective compounds as specified by the invention.

Equivalent results were obtained with magnetic recording tape samples which were prepared by the same procedure as above except that the starting material was changed to α-Fe$_2$O$_3$.

INDUSTRIAL APPLICABILITY

The magnetic recording media according to the first and second embodiments of the present invention have a high coercive force and high saturated magnetization and are thus suitable for high density recording.

Due to improved surface property, the media can provide a high output and a high S/N or C/N.

The surface property can be improved while maintaining the coefficient of friction μ fully low. This ensures stable travel of the media, leading to an improvement in the durability of the media.

In the second embodiment, there are achieved further improvements in output and C/N or S/N.

We claim:

1. A magnetic recording medium comprising a nonmagnetic substrate and a magnetic layer formed thereon containing a coated iron base metal magnetic powder and a binder, wherein said coated iron base metal magnetic powder is made by the process of furnishing hydrous iron oxide or iron oxide powder as a starting material, applying, by weight based on the iron of the metal magnetic powder, a Zr compound in an amount of 0.01 to 5%, an Al compound in an amount of 0.1 to 8%, and a Si compound in an amount of 0.1 to 8%, to the surface of the powder, and reducing the coated powder in a reducing atmosphere.

2. The magnetic recording medium of claim 1 wherein the step of applying a Zr compound, an Al compound, and an Si compound to the powder surface includes preparing a slurry of the starting material and adding an aqueous solution containing Zr, Al, and Si compounds to the slurry, followed by mixing.

3. The magnetic recording medium of claim 1 wherein said metal magnetic powder has an average major axis length l of from 0.1 to 0.5 μm, an average minor axis length d of from 0.01 to 0.035 μm, and an average aspect ratio l/d of from 3 to 40.

4. The magnetic recording medium of any one of claims 1 to 3 wherein said magnetic layer has a surface roughness $R_{20}$ of up to 0.035 μm and a coefficient of friction of 0.20 to 0.35.

5. A magnetic recording medium comprising a nonmagnetic substrate and a magnetic layer formed thereon containing a coated iron base metal magnetic powder and a binder, wherein said coated iron base metal magnetic powder is made by the process of furnishing hydrous iron oxide or iron oxide powder as a starting material, applying, by weight based on the iron of the metal magnetic powder, a Zr compound in an amount of 0.01 to 5%, an Al compound in an amount of 0.1 to 8%, and a Co compound in an amount of at least 0.5%, to the surface of the powder, and reducing the coated powder in a reducing atmosphere.

6. The magnetic recording medium of claim 5 wherein in addition to the Co, Zr, and Al compounds, an Si compound is applied in an amount of 0.1 to 8% by weight of Si based on the iron of the metal magnetic powder.

7. The magnetic recording medium of claim 5 wherein the step of applying a Zr compound, an Al compound, and a Co compound to the powder surface includes preparing a slurry of the starting material and adding an aqueous solution containing Co, Zr, and Al compounds to the slurry, followed by mixing.

8. The magnetic recording medium of claim 7 wherein said aqueous solution further contains an Si compound.

9. The magnetic recording medium of claim 5 wherein said metal magnetic powder has an average major axis length l of from 0.1 to 0.5 μm, an average minor axis length d of from 0.01 to 0.035 μm, and an average aspect ratio l/d of from 3 to 40.

10. The magnetic recording medium of any one of claims 5 to 9 wherein said magnetic layer has a surface roughness $R_{20}$ of up to 0.035 μm and a coefficient of friction of 0.20 to 0.35.

* * * * *

UNITED STATES PATENT AND TRADEMARK OFFICE
CERTIFICATE OF CORRECTION

PATENT NO. : 5,225,281
DATED : July 6, 1993
INVENTOR(S) : Kiminori Tamai et al.

It is certified that error appears in the above-indentified patent and that said Letters Patent is hereby corrected as shown below:

On the title page, Item [87],

The PCT Pub. Date, should read: --Feb. 7, 1991--

Signed and Sealed this

Twenty-second Day of March, 1994

Attest:

BRUCE LEHMAN

*Attesting Officer*     Commissioner of Patents and Trademarks